(12) United States Patent
Satoh et al.

(10) Patent No.: US 6,489,887 B2
(45) Date of Patent: Dec. 3, 2002

(54) LANE-KEEP ASSISTING SYSTEM FOR VEHICLE

(75) Inventors: Shigeki Satoh, Kanagawa (JP); Hiroshi Mouri, Yokohama (JP); Masayasu Shimakage, Kanagawa (JP); Hiroshi Kawazoe, Kanagawa (JP); On Sadano, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/946,925

(22) Filed: Sep. 6, 2001

(65) Prior Publication Data

US 2002/0041229 A1 Apr. 11, 2002

(30) Foreign Application Priority Data

Sep. 6, 2000 (JP) ........................................ 2000-269562

(51) Int. Cl.[7] .................................................. B60Q 1/00
(52) U.S. Cl. ...................... 340/436; 340/435; 340/937; 348/148; 701/301
(58) Field of Search ................................ 340/435, 436, 340/937; 701/301; 348/148

(56) References Cited

U.S. PATENT DOCUMENTS 6,005,492 A * 12/1999 Tamura et al. ............... 340/937
6,292,111 B1 * 9/2001 Ishikawa et al. ............. 340/937
6,308,123 B1 * 10/2001 Ikegaya et al. ................ 701/41

FOREIGN PATENT DOCUMENTS

| JP | 6-14230 | 1/1994 |
|---|---|---|
| JP | 7-23370 | 1/1995 |
| JP | 8-5388 | 1/1996 |
| JP | 9-270098 | 10/1997 |
| JP | 9-295524 | 11/1997 |
| JP | 11-29016 | 2/1999 |
| JP | 11-296660 | 10/1999 |
| JP | 11-348696 | 12/1999 |
| JP | 2000-20897 | 1/2000 |

* cited by examiner

*Primary Examiner*—Daniel J. Wu
(74) *Attorney, Agent, or Firm*—Foley & Lardner (57) ABSTRACT

A system for assisting a lane-keep traveling of a vehicle is comprised of a camera for detecting a view ahead of the vehicle, a vehicle behavior detector including a vehicle speed sensor and a yaw rate sensor, and a controller. The controller is arranged to estimate a road shape on the basis of lane markers detected by the camera, to detect a target yaw rate necessary to return the vehicle at a center of the lane markers, and to determine that there is a possibility that the vehicle deviates from the lane when a difference between the target yaw rate and an actual yaw rate detected by the yaw rate sensor becomes greater than a threshold.

15 Claims, 11 Drawing Sheets

MODEL LANE MARKER
MODEL LANE MARKER

FIG.7

MODEL LANE MARKER
MODEL LANE MARKER

MARKER POINT

LANE-KEEP ASSISTING SYSTEM FOR VEHICLE

BACKGROUND OF THE INVENTION

The present invention relates to a system and method for assisting lane-keep traveling of a vehicle, and more particularly to a lane-keep assisting system which determines whether a vehicle tends to deviate from a lane according to a vehicle traveling condition on the lane.

Japanese Patent Provisional Publication No. 11-348696 discloses a system for assisting a vehicle to travel along a lane. This system is arranged to generate alarm on the basis of a relative position of the vehicle relative to lane markers.

SUMMARY OF THE INVENTION

However, in the case that the vehicle travels along a small-radius corner, the alarm is not generated even if the vehicle is not steered along the corner, and the alarm is generated only when the relative distance between the vehicle and the lane marker becomes smaller than a predetermined value. Further, even when the vehicle is turning a corner along a lane, this known system generates alarm continuously or intermittently according to the small relative distance.

It is therefore an object of the present invention to provide a lane-keep assisting system which accurately detects that the vehicle tends to deviate from a traveling lane.

An aspect according to the present invention resides in a system for assisting a lane-keep traveling of a vehicle. The system comprises a road image detector, a vehicle behavior detector and a controller. The road image detector takes a view ahead of the vehicle. The vehicle behavior detector detects a behavior of the vehicle. The controller is coupled to the road image sensor and the vehicle behavior detector. The controller is arranged to calculate a road shape on the basis of the view taken by the road image detector, to calculate a target turn indicative value indicative of a target turn for reaching the vehicle to a target position, on the basis of the road shape detected, to calculate an actual turn indicative value indicative of an actual turn of the vehicle, and to determine whether the vehicle approaches a lane boundary of a traveling lane, on the basis of the target turn indicative value and the actual turn indicative value.

DETAILED DESCRIPTION OF THE INVENTION

Referring to FIGS. 1 to 12, there is shown a first embodiment of a lane-keep assisting system S according to the present invention.

Figure 1:
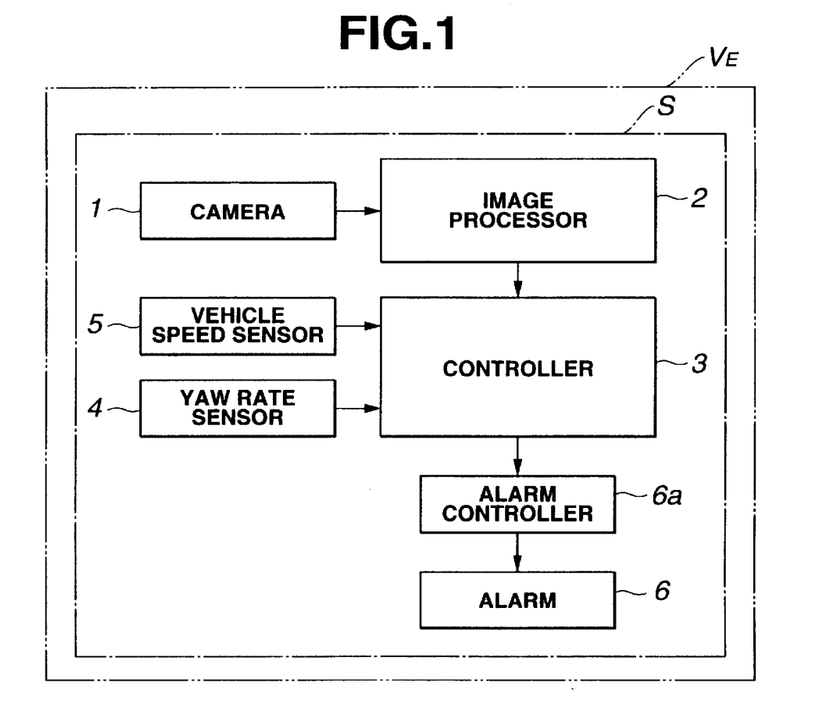
FIG. 1 is a schematic view showing a first embodiment of a lane-keep assisting system according to the present invention.

As shown in FIG. 1, the lane-keep assisting system S is installed to a vehicle VE and comprises a CCD camera 1, an image processor 2, a controller 3, a yaw rate sensor 4, a vehicle speed sensor 5, an alarm 6 and an alarm controller 6a.

Figure 2:
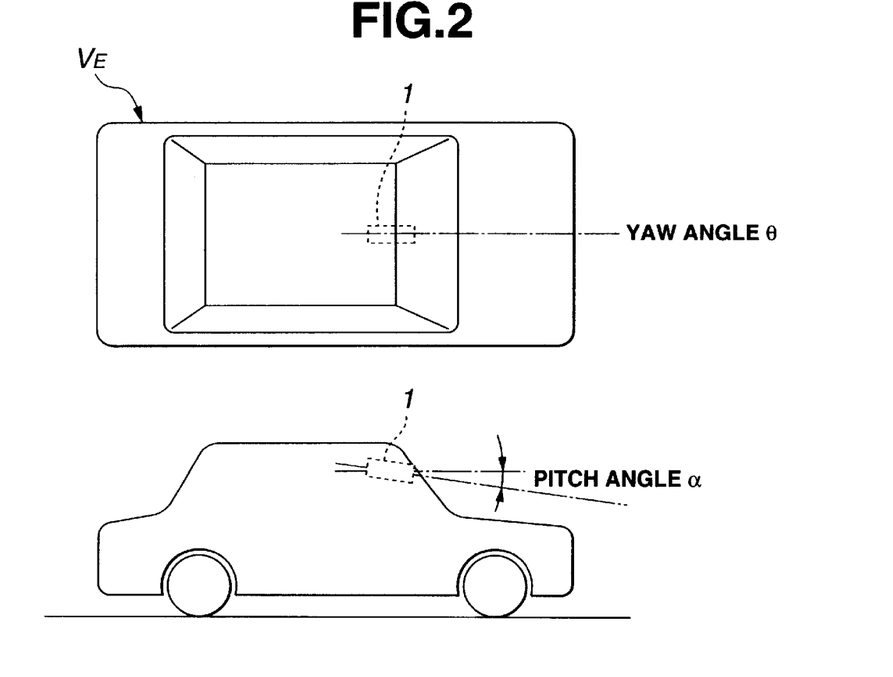
FIG. 2 is an explanatory view showing an installation position of a camera employed in the system of FIG. 1.

CCD camera 1 is installed in a passenger compartment of vehicle VE. More specifically, camera 1 is installed at an upper and laterally center position near a front window as shown in FIG. 2 so that a yaw angle θ between an optical axis of a lens of camera 1 and a longitudinal center axis of vehicle VE is zero and a pitch angle therebetween is a. Camera 1 takes an image of a road view ahead of vehicle VE. Image processor 2 is coupled to camera 1 and receives data of the image taken by camera 1. Image processor 2 processes the image in order to detect lane markers of a traveling lane and sends the processed image data to controller 3.

Controller 3 transforms a shape of lane markers into a mathematical model by using a plurality of parameters representative of a shape of the road shape and a vehicle behavior. By updating the parameters so as to correspond the detection result of the lane markers with model lane markers, controller 3 detects and recognizes the lane markers. On the basis of a present actual yaw rate $\theta_{REAL}$ detected by a yaw rate sensor 4 and a vehicle speed V detected by a vehicle speed sensor 5, controller 3 detects a lane keep condition of vehicle VE. When vehicle VE is approaching the lane marker and will cross the lane marker, that is, when vehicle VE tends to deviate the lane, controller 3 operates an alarm 6 through an alarm controller 6a. Alarm 6 gives a warning to a driver by generating warning sound or displaying warning information.

Figure 3:
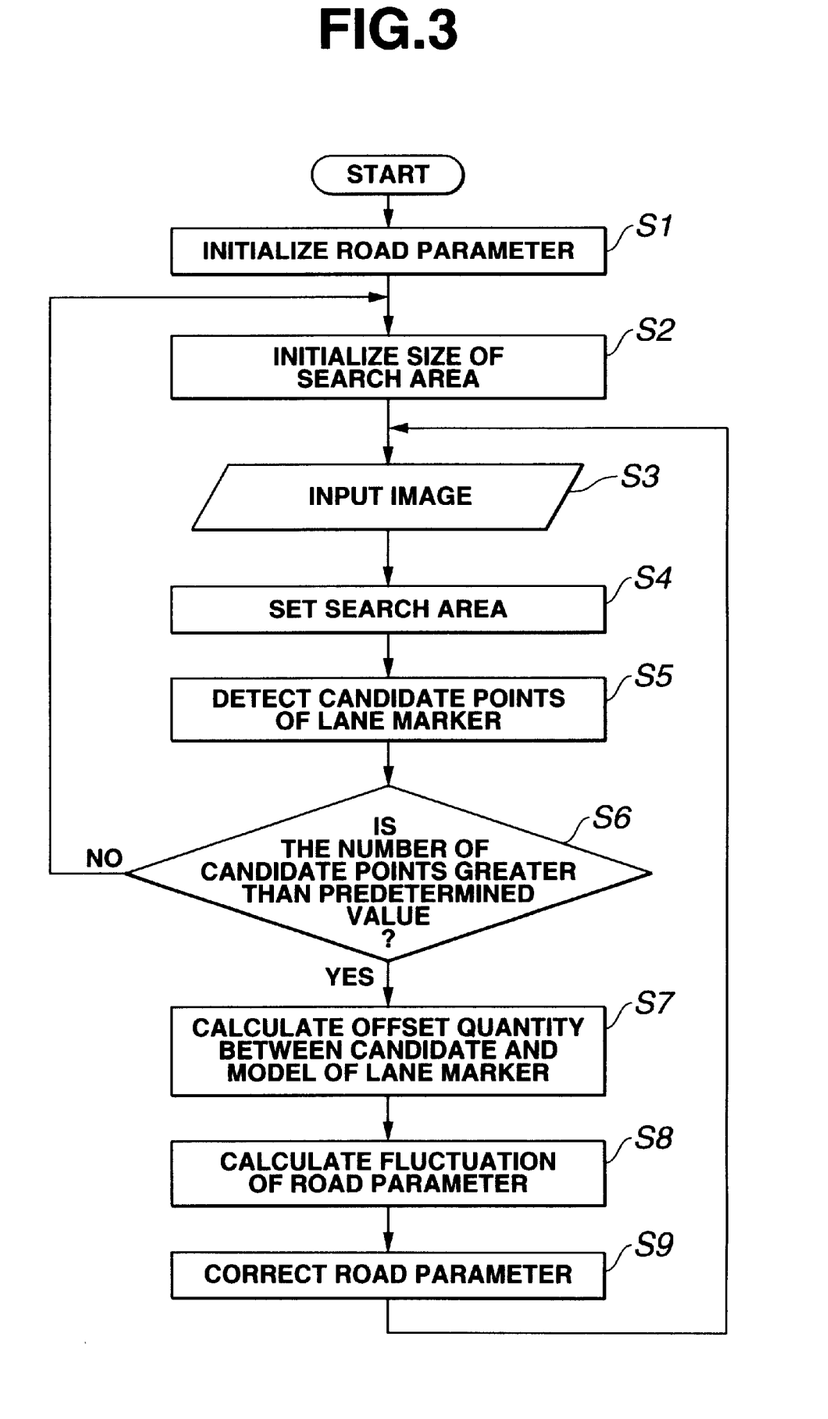
FIG. 3 is a flowchart showing a lane marker detecting process employed in the first embodiment.

A flowchart of FIG. 3 shows a procedure of a lane marker detecting process executed by controller 3. The lane marker detecting process is a process for detecting lane markers of a road ahead of vehicle VE and is incorporated by Japanese Patent Provisional Publication No. 11-296660 filed by the assignee of the present invention.

Figure 4:
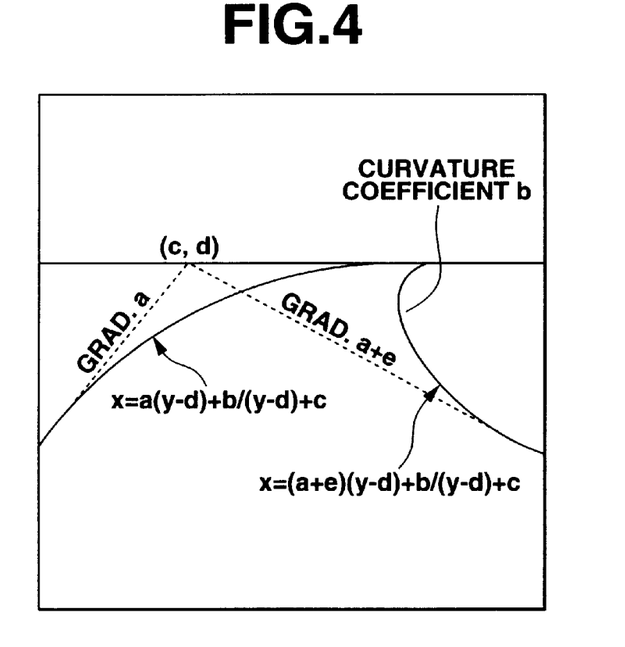
FIG. 4 is a view employed for explaining model lane markers.

At step S1 controller 3 initializes parameters representative of a road shape and a vehicle behavior (hereinafter, these parameters called road parameters). In a X-Y image-plane coordinate system shown in FIG. 4, model lane markers are represented by the following equation (1) using the road parameters.

$$X=(a+ie)(Y-d)+b/(Y-d)+c \tag{1}$$

where a, b, c, d and e are the road parameters, and i is 1 and 0. Assuming that a vertical dimension between camera 1 and a road surface is constant, road parameter a denotes a lateral displacement of vehicle VE between the lane markers, b denotes a road curvature, c denotes a yaw angle of vehicle VE (the optical axis of camera 1) relative to the road, d denotes a pitch angle of vehicle VE (the optical axis of camera 1) relative to the road, and e denotes a dimension between the lane markers.

Under the initial condition, the shape of the road and the lane markers and the vehicle behavior are set at values corresponding to center values, respectively since the shapes of the road and the lane markers and the vehicle behavior are not clear in this initial condition. More specifically, the lateral displacement a of vehicle VE within the lane markers is set at a center between the lane markers, the road curvature b is set at zero (straight), the yaw angle c relative to the lane markers is set at zero, the pitch angle d relative to the lane markers is set at $\alpha°$ indicative of a vehicle stopping condition, and the lane width e between the lane markers is set at a lane width of a highway representatively defined by the rule of a road structure.

Figure 5:
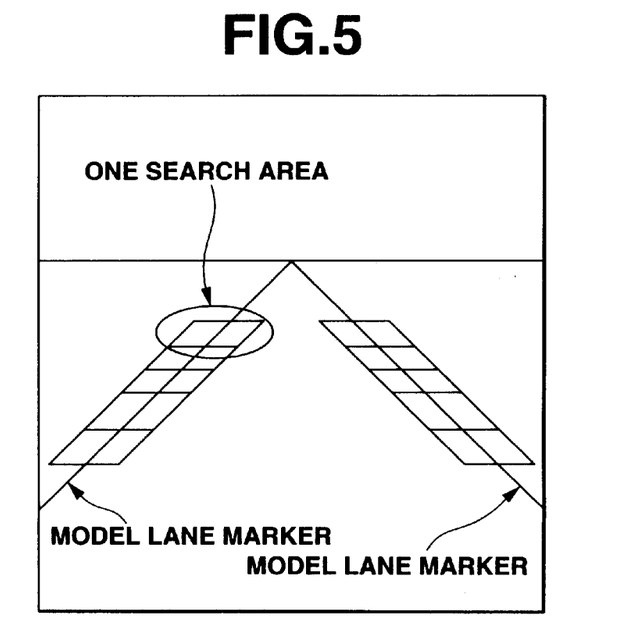
FIG. 5 is a view employed for explaining a method for setting initial values of candidate lane marker search areas.
Figure 6:
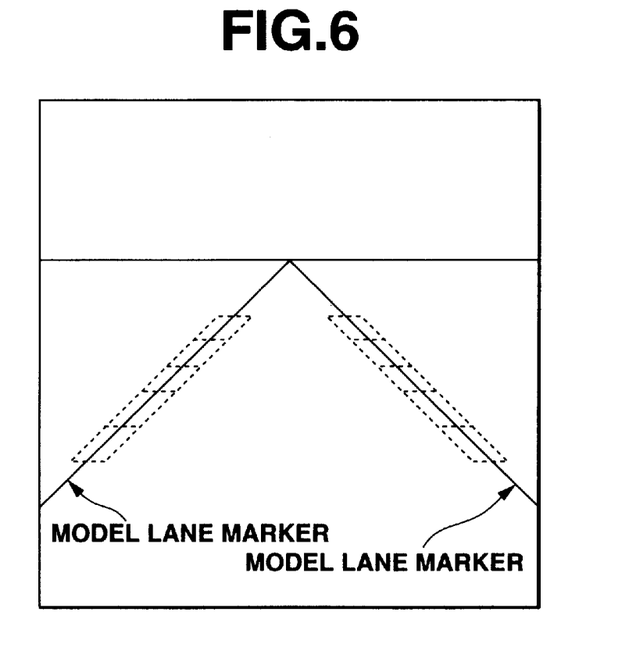
FIG. 6 is a view employed for explaining the setting method of the initial values of the search area under a condition that lane markers have been already detected.

At step S2 controller 3 initializes small areas for detecting a candidate lane marker. Under the initial condition, since it is supposed that there is a large difference between the model lane markers obtained by inputting the initial values into the respective road parameters a to e and the actual lane markers on the image plane, it is preferable that relatively large areas are set initially. As shown in FIG. 5, in this embodiment ten search areas including five right search areas and five left search areas are searched, and the size of each search area is set large. If the lane markers have been detected already in the previous process, the size of each search area is set small as shown in FIG. 6. The reason thereof is as follows: Since it is assumed that the difference between the actual lane markers and the model lane markers is small, a possibility of an erroneous detection of detecting other objects will be decreased by setting the size of each search area small. Further this small setting improves the processing speed of this process.

At step S3 controller 3 receives an image which image processor 2 obtains by processing an image taken by camera 1.

Figure 7:
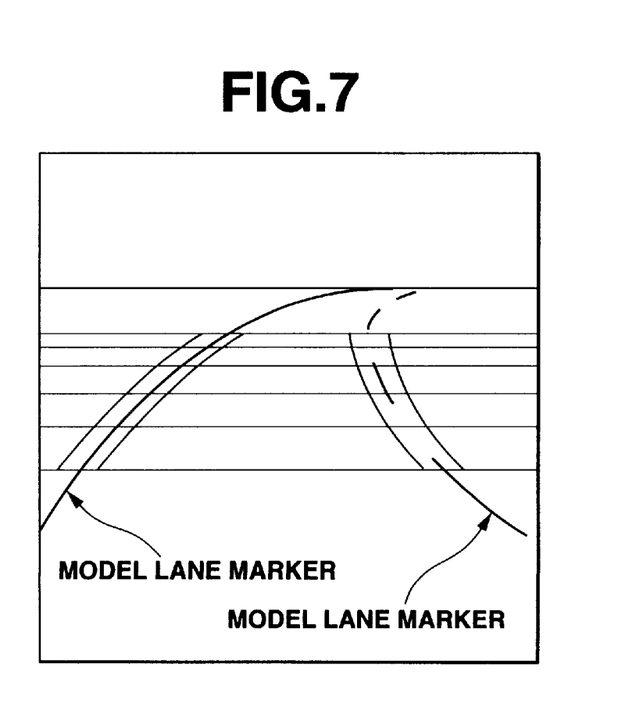
FIG. 7 is a view employed for explaining the search area setting method on a road image.

At step S4 controller 3 sets the search areas of the candidate lane markers on the road image received from image processor 2. During this setting, the candidate lane-marker search areas are set so that the model lane markers are located at centers of the respective search areas as shown in FIG. 7, on the basis of the candidate lane-marker search areas calculated at step S2 and the model lane markers obtained form the road parameters corrected at step S1 or S9. As shown in FIG. 7, the number of the lane marker search areas is ten constituted by five search areas for the right lane marker and five search areas for the left lane marker. It will be understood that the lane marker search areas may be set at positions offset from the model lane markers according to the change of the past model lane markers.

Figure 8:
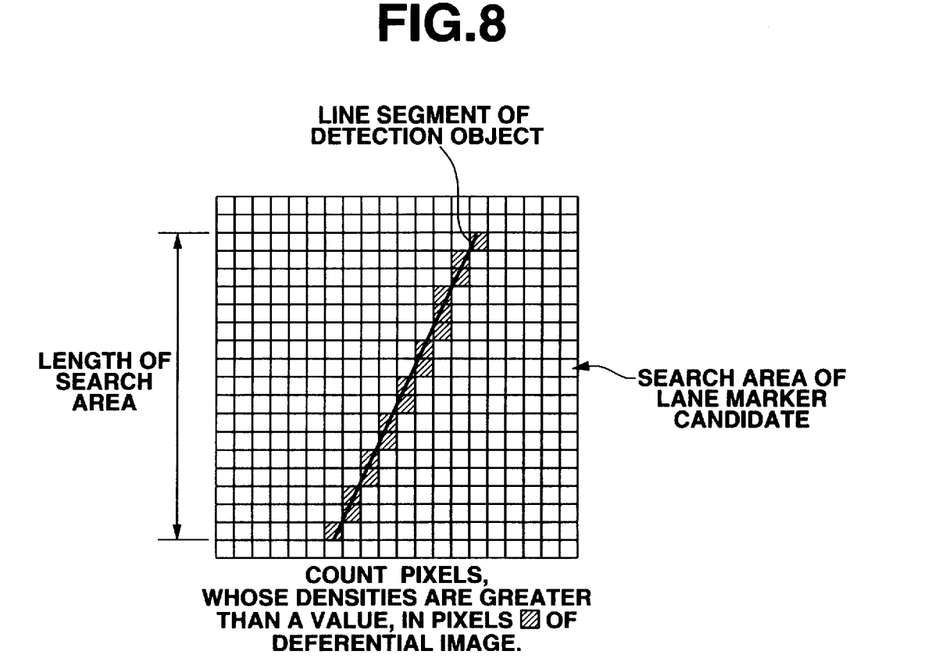
FIG. 8 is a view employed for explaining a detecting method of candidate lane marker points.

At step S5 controller 3 detects the candidate lane marker in each lane marker search area. In this detecting operation, first a differential image is produced by filtering the input image with a Sobel filter. Then controller 3 counts suitable pixels which are located on the line segment and whose densities are greater than a value capable of extracting the detection line, with respect to each line segment generated by connecting a point on an upper base line and a point on a lower base line of each search area. Further the points on the upper and lower base lines are varied, and as to a predetermined number of the line segments the counting of the suitable pixels are executed. The line segment, which includes the largest number of the suitable pixels in the whole line segments, is determined as a detection straight line. The start and end of the detection straight line are determined as the candidate lane marker points. When the number of the suitable pixels of the determined detection straight line is smaller than a predetermined rate to the number of pixels corresponding to the length of the search area, controller 3 determines that there is no candidate lane marker point in this search area.

For example, under a condition that the number of pixels corresponding to the length of the search are is fifteen and the predetermined rate is ½, if the number of the suitable pixels of the detection straight line are seven or less, controller 3 determines that there is no candidate lane marker point. If the number of the suitable pixels of the detection straight line segment are eight or more, controller 3 determines that the start and the end of the selected line segment is treated as the candidate line marker points.

The above operation of determining the candidate lane-marker points is executed by each candidate lane-marker search area.

In determining the candidate lane-marker points, the predetermined rate may be set at a constant rate throughout all search areas or may be varied by each search area. Further the predetermined value of the density may be set at a constant value throughout all search areas or may be varied by each search area.

At step S6 controller 3 checks whether the number of the candidate lane-marker points of the whole candidate lane-marker search area is greater than or equal to a predetermined value agreeable to deciding as a lane marker. When the number of the candidate lane marker points is smaller than the predetermined value, controller 3 determines that there is no lane marker in the search areas, and the routine of this flowchart returns to step S2 to again initialize the size of the search area. When the number of the candidate lane-marker points is greater than or equal to the predetermined value, the routine proceeds to step S7.

Figure 9:
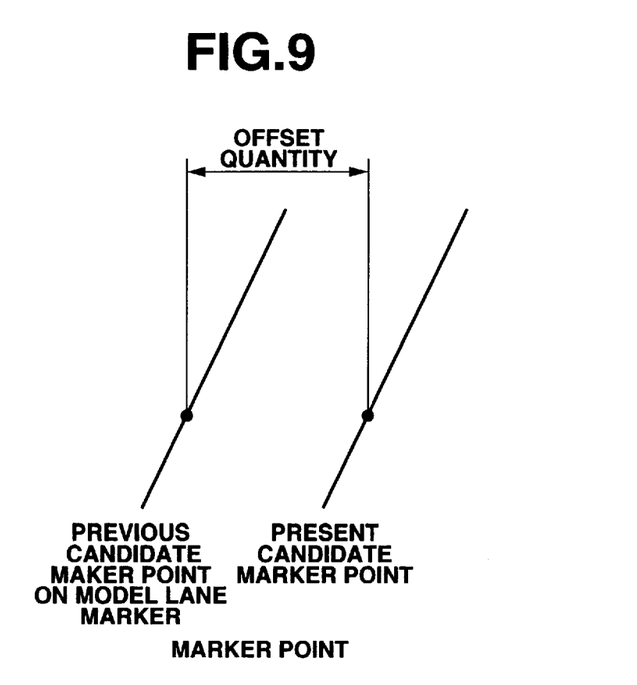
FIG. 9 is a view showing an offset quantity between a candidate lane marker point just detected and a point on the model lane marker previously detected.

At step S7 controller 3 calculates an offset quantity between the determined candidate lane-marker point and a point on the model lane marker obtained by the previous processing by each candidate lane marker point.

At step S8 controller 3 calculates fluctuation quantities $\Delta a$, $\Delta b$, $\Delta c$, $\Delta d$ and $\Delta e$ of the road parameters a to e. The calculation of the fluctuation quantities $\Delta a$ to $\Delta e$ may be executed on the basis of a least-square method, for example, disclosed in Japanese Patent Provisional Publication No. 8-5388.

At step S9 controller 3 corrects road parameters a to e on the basis of fluctuation quantities $\Delta a$ to $\Delta e$ calculated at step S8. When the model lane marker expressed by the equation (1) is employed, the correction of the fluctuation quantities is executed by using the following equations (2).

$$a=a+\Delta a$$
$$b=b+\Delta b$$
$$c=c+\Delta c$$
$$d=d+\Delta d$$
$$e=e+\Delta e \tag{2}$$

The corrected road parameters a to e are stored in a predetermined memory area of controller 3 as a road parameters of a new model lane markers.

Following the execution of step S9, the routine returns to step S3 to repeat the above mentioned routine.

Controller 3 executes a traveling condition monitoring process for generating alarm according to the traveling condition of vehicle VE, on the basis of the road parameters of the model lane markers detected from the image information taken by camera 1. That is, the monitoring process is executed as shown by a flowchart of FIG. 10.

Figure 10:
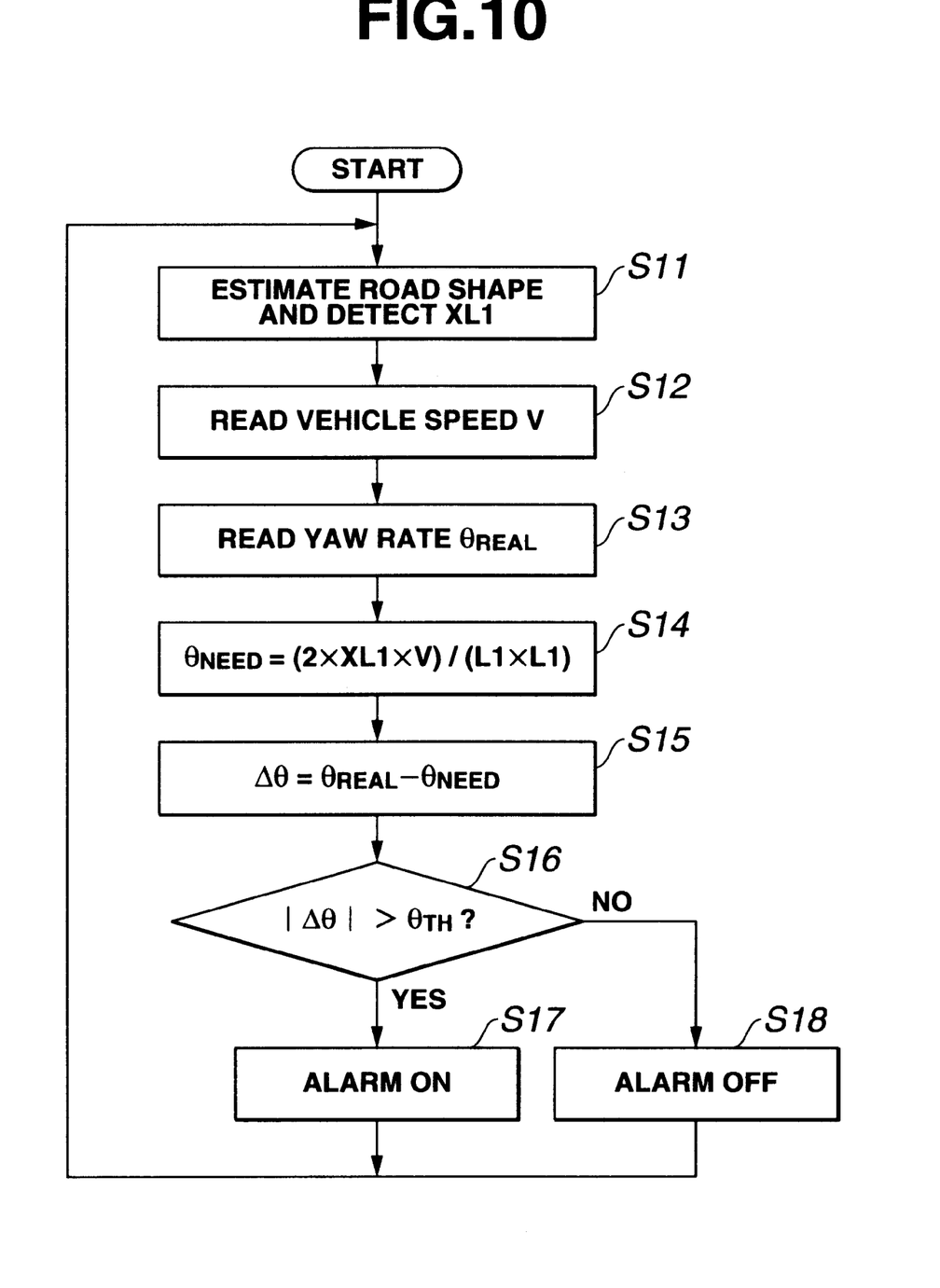
FIG. 10 is a flowchart showing a traveling condition monitoring process of the first embodiment.
Figure 11:
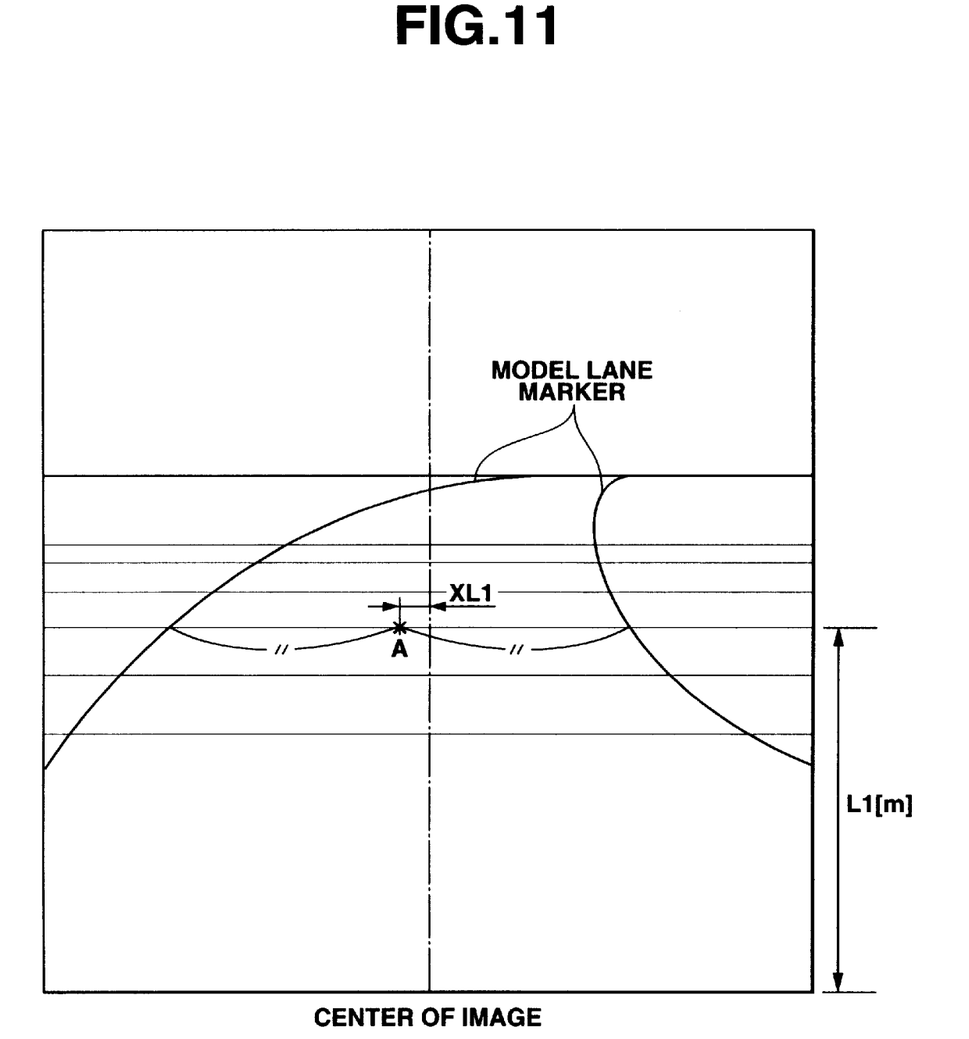
FIG. 11 is a view employed for explaining a method for detecting a lateral displacement at a fixation point.

At step S11 controller 3 estimates a road shape on the basis of the newest road parameters a to e stored in the storage area. Further, controller 3 detects a lateral displacement XL1 at a fixation point A on the image plane showing a view ahead of vehicle VE. More specifically, as shown in FIG. 11, when the road shape is estimated on the basis of the road parameters a to e corrected at step S9, the fixation point A is set at a position (target position) which is ahead of vehicle VE by L1m such as 30m and is located at a center between the two model lane markers. Therefore, controller 3 detects a distance between the fixation point A and the point, which is L1[m] ahead of vehicle VE, as the lateral displacement XL1 relative to the lane center position defined by the two model lane markers, since camera 1 is set at a laterally center position of vehicle VE.

At step S12 controller 3 reads a vehicle speed V from vehicle speed sensor 5, and at step S13 controller 3 reads an actual yaw rate $\theta_{REAL}$ from yaw rate sensor 4.

At step S14 controller 3 calculates a target yaw rate $\theta_{NEED}$, which is a yaw rate necessary for reaching vehicle VE from the lateral displacement position to the lane center, on the basis of lateral displacement XL1 at fixation point A and the following equation (3).

$$\theta_{NEED} = (2 \times XL1 \times V)/(L1 \times L1) \quad (3)$$

At step S15 controller 3 calculates a yaw rate difference $\Delta\theta$ between actual yaw rate $\theta_{REAL}$ and target yaw rate $\theta_{NEED}$ ($\Delta\theta = \theta_{REAL} - \theta_{NEED}$).

At step S16 controller 3 determines whether an absolute value $|\Delta\theta|$ of yaw rate difference $\Delta\theta$ is greater than a threshold $\theta_{TH}$. When the determination at step S16 is affirmative, that is, when $|\Delta\theta| > \theta_{TH}$, the routine proceeds to step S17 wherein controller 3 commands alarm controller 6a to operate alarm 6. By this warning operation, controller 3 informs the driver that vehicle VE tends to cross the lane marker. Following the execution of step S18, the routine returns to step S11. When the determination at step S16 is negative, that is, when $|\Delta\theta| \leq \theta_{TH}$ the routine proceeds to step S18 wherein controller 3 commands alarm controller 6a to turn off alarm 6. Following the execution of step S18, the routine returns to step S11. The threshold $\theta_{TH}$ has previously determined on the basis of experiments. If vehicle VE is traveling while keeping actual yaw rate $\theta_{REAL}$ at the threshold $\theta_{TH}$, vehicle VE will deviate from the lane. Camera 1 functions as an image detecting means. Yaw rate sensor 4 functions as an actual turn detecting means. The lane marker detecting process shown in FIG. 3 functions as a lane marker detecting means. The road shape estimating process in the lane marker detecting process of FIG. 3 and step S11 of FIG. 10 functions as a target turn detecting means. Steps S15 to S18 of FIG. 10 function as lane deviation determining means.

Next, the manner of operation of the system according to the present invention will be discussed.

When vehicle VE travels on a road, camera 1 takes images ahead of vehicle VE and sends to image processor 2. Image processor 2 processes the received images in a predetermined manner of the image processing and sends the processed data (image information) of the image to controller 3. Controller 3 executes the lane marker detecting process as to the received image information and updates the road parameters according to the road condition at the forward position of vehicle VE.

Controller 3 estimates the road shape on the basis of the calculated road parameters and calculates the lateral displacement XL1 at the fixation point A on the basis of the estimated road shape as executed at step S11 in FIG. 10.

When vehicle VE travels straight on a center of the lane, camera 1 is directed toward the center of the lane and takes images. Therefore, in this vehicle traveling condition, the center of the picture image taken by camera 1 generally corresponds to the fixation point A, and thus the lateral displacement XL1 is almost zero. Accordingly, target yaw rate $\theta_{NEED}$ is almost zero. Further, since actual yaw rate $\theta_{REAL}$ detected by yaw rate sensor 4 becomes almost zero, the absolute value $|\Delta\theta|$ becomes smaller than threshold $\theta_{TH}$. Therefore, the processing in FIG. 10 moves from step S16 to step S18 wherein controller 3 determines that vehicle VE is traveling without deviating from the traveling lane and therefore the alarm is put in a turned off condition.

Figure 12:
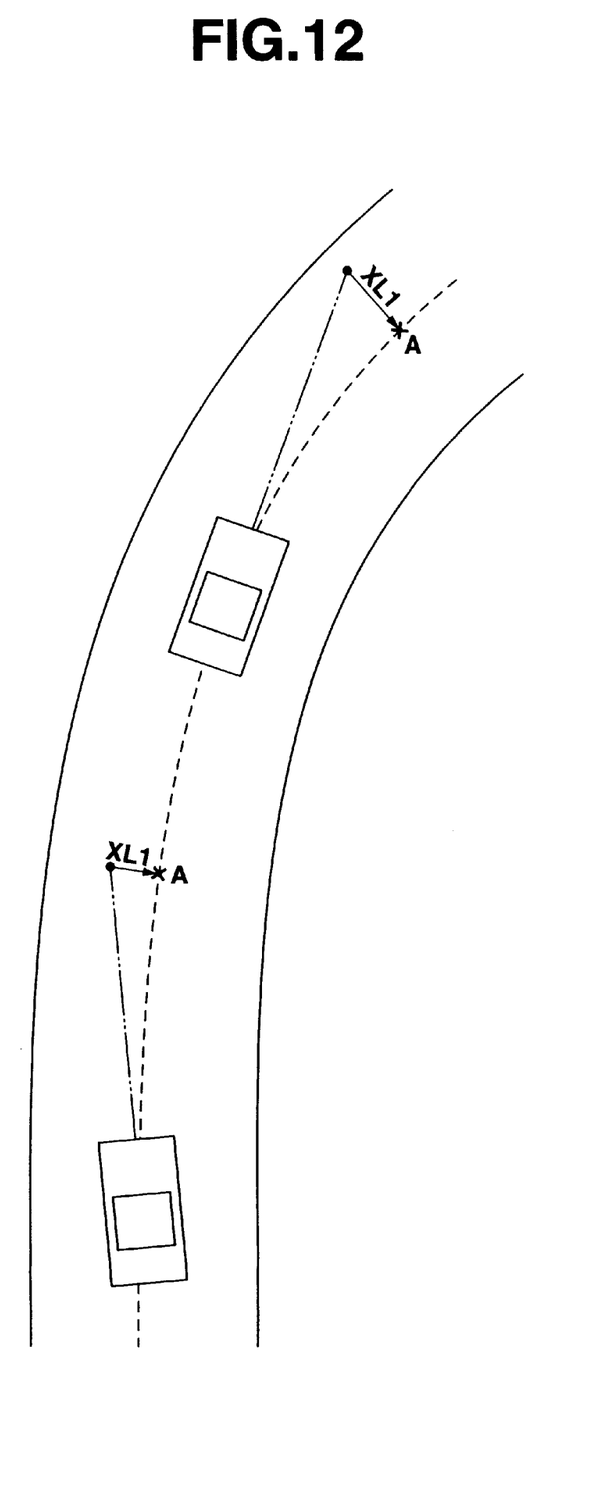
FIG. 12 is a view employed for explaining the operation of the system according to the present invention.

When the road condition to vehicle VE is changed from the straight road to the right hand curved road shown in FIG. 12, the direction of camera 1 is offset from the center of the traveling lane and therefore the lateral displacement XL1 becomes large.

However, since the driver steers vehicle VE so that vehicle VE travels along the center of the lane, actual yaw rate $\theta_{REAL}$ is increased according to the degree to the steering operation. Therefore, when vehicle VE travels along the center of the lane, actual yaw rate $\theta_{REAL}$ generally corresponds to target yaw rate $\theta_{NEED}$ calculated based on lateral displacement XL1. Due to this correspondence, the absolute value $|\Delta\theta|$ of the yaw rate difference becomes smaller than threshold $\theta_{TH}$. Therefore, the processing in FIG. 10 proceeds from step S16 and to step S18 wherein the alarm is put in a turned off condition.

When vehicle VE is turning along the center of the lane, actual yaw rate $\theta_{REAL}$ generally corresponds to target yaw rate $\theta_{NEED}$ calculated based on lateral displacement XL1. Therefore, in this turning condition, the alarm is put in a turned off condition.

Further when vehicle VE tends to deviate from the lane from the turning condition along the center of the lane, actual yaw rate $\theta_{REAL}$ cannot satisfy target yaw rate $\theta_{NEED}$, and therefore the absolute value $|\Delta\theta|$ of the yaw rate difference $\Delta\theta$ becomes large. Further, when the absolute value $|\Delta\theta|$ becomes larger than threshold $\theta_{TH}$, controller 3 determines that there is a possibility that vehicle VE deviates from the traveling lane. Accordingly, the processing in FIG. 10 proceeds from step S16 to step S17 to generate warning sound or warning information. In reply to this warning information, the driver executes the steering operation, and therefore vehicle VE can keep traveling on the lane without deviating from the lane.

On the other hand, when vehicle VE enters a curved without executing a steering operation of traveling vehicle VE along the curve, vehicle VE is not traveling along the lane. Therefore, the direction of camera 1 is changed, and the center of the picture image is offset from the center of the lane. Consequently, the lateral displacement XL1 gradually increases. Although target yaw rate $\theta_{NEED}$ also increases, actual yaw rate $\theta_{REAL}$ detected by yaw rate sensor 4 does not increase and generally keeps constant. Accordingly, yaw rate difference Δθ between target yaw rate and actual yaw rate gradually increases, and when the absolute value |Δθ| of the difference becomes larger than threshold $\theta_{TH}$, alarm 6 generates warning information.

With the thus arranged system according to the present invention, when target yaw rate $\theta_{NEED}$ necessary for traveling vehicle VE specified by the lateral displacement XL1 along the center of the lane is compared with actual yaw rate $\theta_{REAL}$ and when the difference therebetween is large, that is, when the curved condition of the road ahead of vehicle VE is compared with the turn condition of vehicle VE and when they do not match with each other, the system generates warning information. Accordingly, it is possible to generate warning information only at the time when the yaw rate is suddenly changed such as in the case of entering the corner of the traveling road. Further, it is possible to accurately generate warning information without erroneously generating warning information as in the case that the lane deviation is detected on the basis of a relative distance between vehicle VE and lane markers.

Furthermore, such an accurate warning effectively assists the traveling of vehicle VE. Additionally, since the system according to the present invention is arranged to determine based on actual yaw rate $\theta_{REAL}$ whether vehicle VE deviates from a lane, it becomes possible to detect deviating from the lane before vehicle VE actually deviates from the lane.

Figure 13:
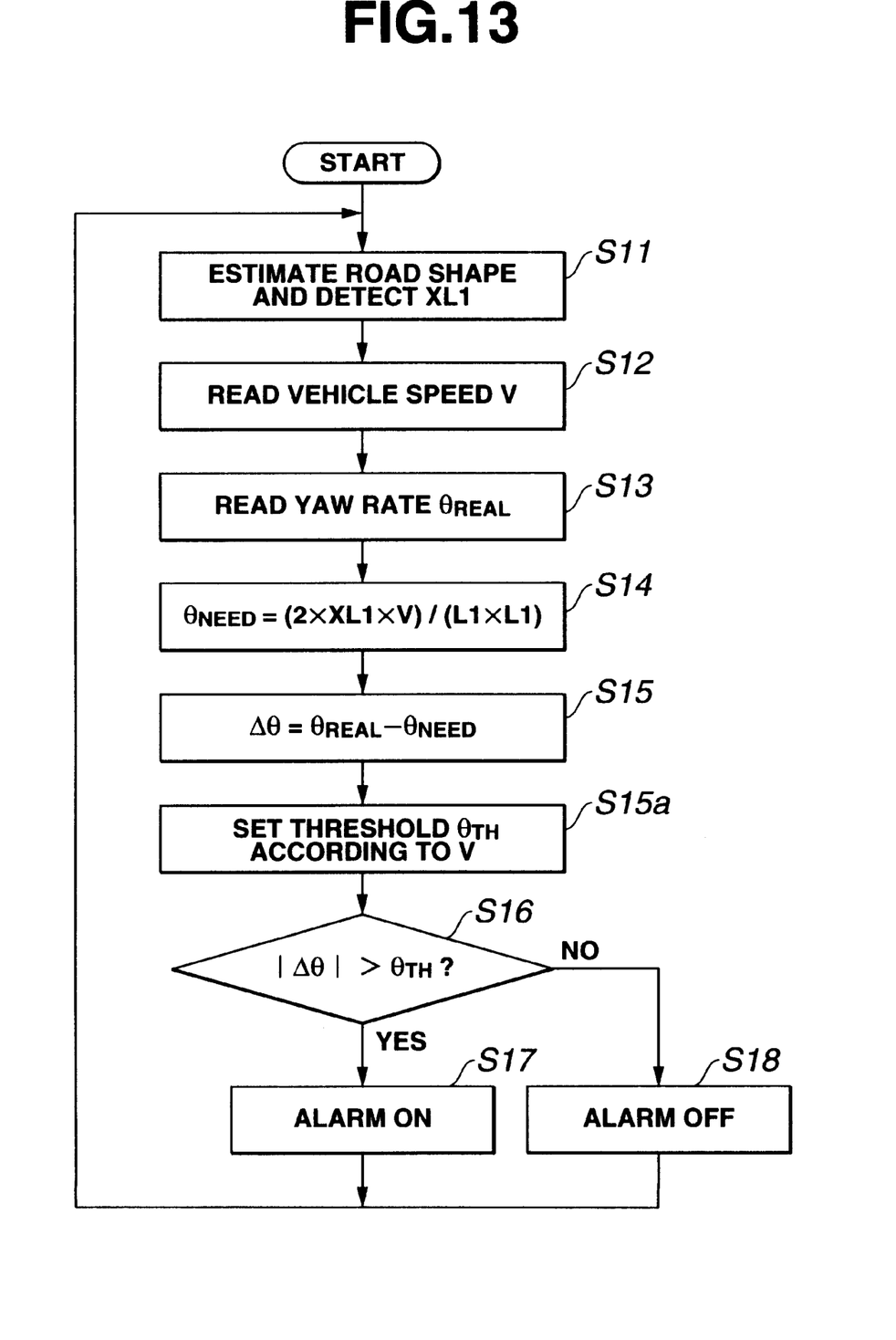
FIG. 13 is a flowchart showing the traveling condition monitoring process of a second embodiment.
Figure 14:
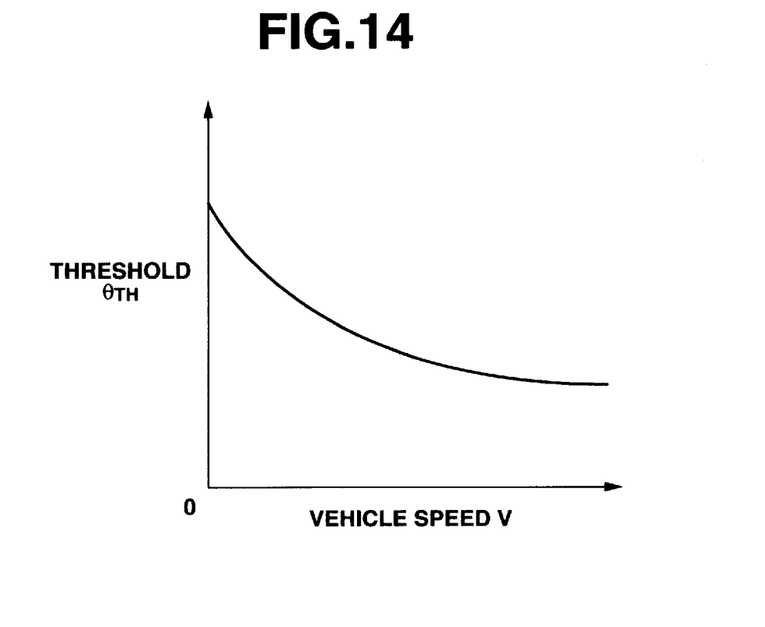
FIG. 14 is a control map showing a relationship between a vehicle speed and a threshold.

Next, referring to FIGS. 13 and 14, there is shown a second embodiment of the lane-keep assisting system according to the present invention. The second embodiment is basically the same as the first embodiment except for a setting method of threshold $\theta_{TH}$. Accordingly, the same parts are denoted by the same reference numerals and the explanation thereof is omitted herein.

As shown in FIG. 13, the traveling condition monitoring process of the second embodiment further includes step S15a in addition to steps S11 to S18 shown in FIG. 10 of the first embodiment.

At step S15a following the execution of step S15, controller 3 sets threshold $\theta_{TH}$ according to vehicle speed V. More specifically, a threshold map representative of a relationship between threshold $\theta_{TH}$ and vehicle speed V has previously stored in memory area of controller 3. Controller 3 determines threshold $\theta_{TH}$ on the basis of vehicle speed V read at step S12 and the threshold map. The threshold map is set such that threshold $\theta_{TH}$ decreases as vehicle speed V increases. That is, since a time period for reaching the lane deviation is shortened according to the increase of vehicle speed V, it is necessary to detect the lane deviating condition earlier according to the increase of vehicle speed V. By employing the threshold map, the alarm timing is prompted according to the increase of the vehicle speed.

When the absolute value |Δθ| calculated at step S15 is greater than threshold $\theta_{TH}$ determined at step S15a, the routine proceeds from step S16 to step S17 wherein alarm 6 generates alarm information. Since the second embodiment is arranged to set threshold $\theta_{TH}$ according to vehicle speed V, it is possible to detect a lane-deviating condition at an earlier time as vehicle speed V increases. This earlier detection according to vehicle speed enables generates warning information before vehicle deviates from the lane regardless vehicle speed V, and such an accurate warning effectively assists the traveling of vehicle VE. It is of course that the second embodiment ensures the advantages derived by the first embodiment.

Figure 15:
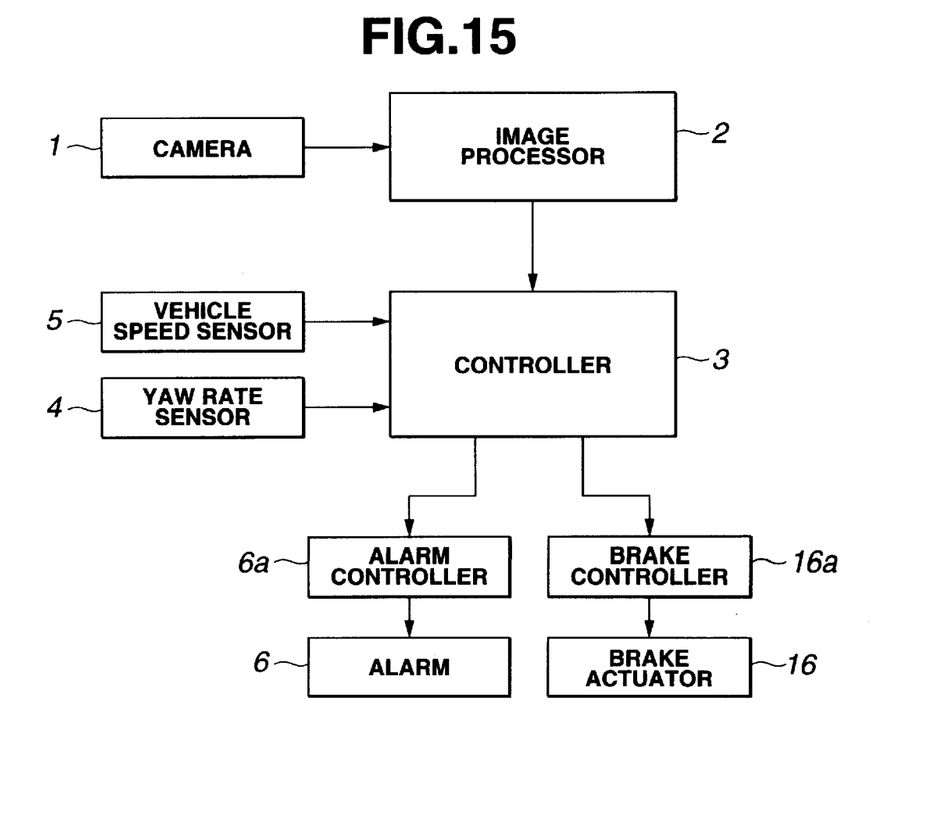
FIG. 15 is a schematic view showing a third embodiment according to the present invention.

Next, referring to FIGS. 15 and 16, there will be discussed a third embodiment of the lane-keep assisting system according to the present invention. As shown in FIG. 15, the third embodiment is basically the same as the first embodiment except that there is further provided brake actuators 16 for generating braking force to wheels and a brake controller 16a for operating brake actuators 16 according to a command from controller 3, in addition to the arrangement of the first embodiment shown in FIG. 1. The same parts are denoted by the same reference numerals and the explanation thereof is omitted herein.

Figure 16:
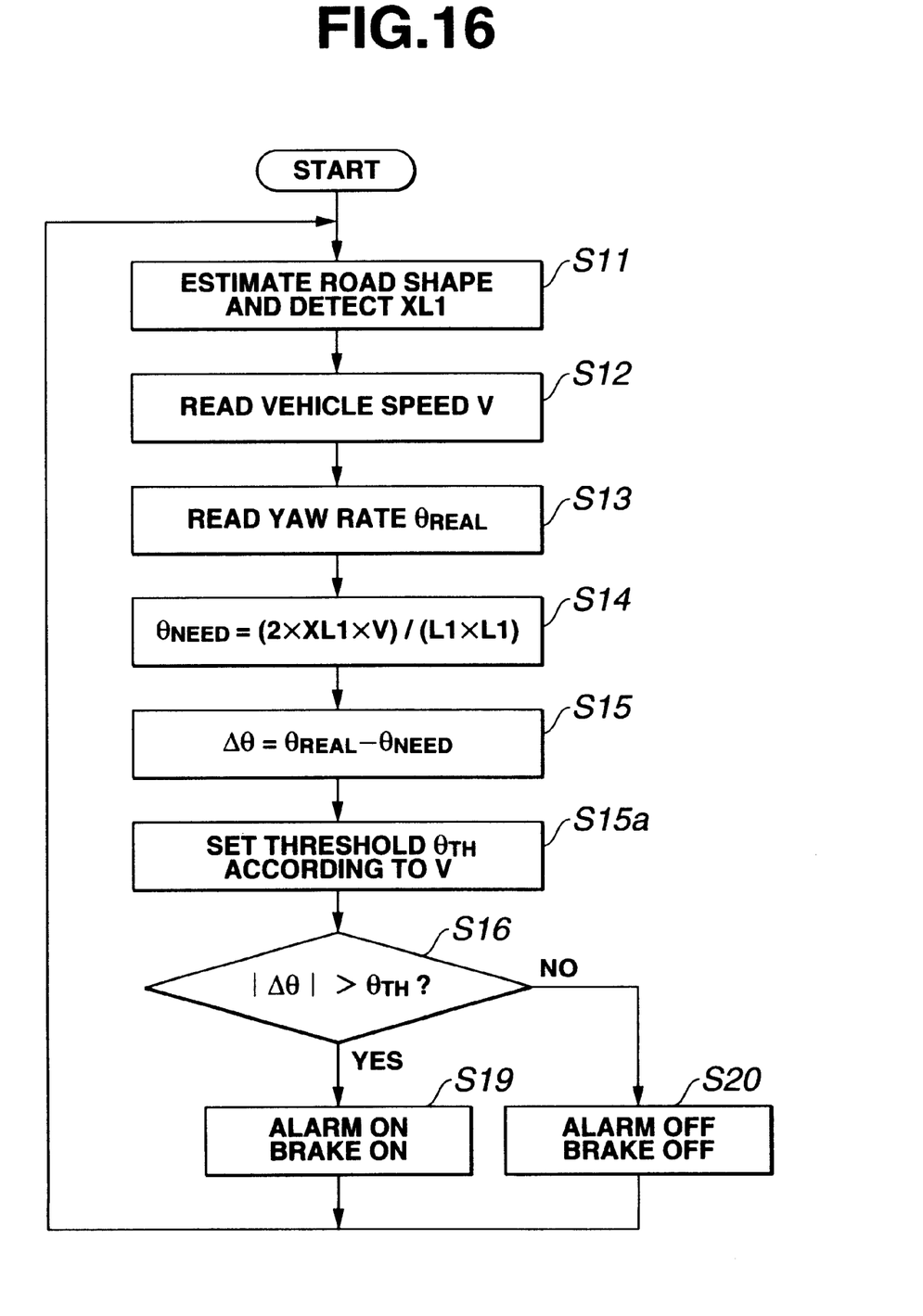
FIG. 16 is a flowchart showing the traveling condition monitoring process of the third embodiment.

As shown in FIG. 16, the traveling condition monitoring process of the third embodiment employs steps S19 and S20 instead of steps S17 and S18, as compared with the flowchart of FIG. 13 of the second embodiment.

When controller 3 determines at step S16 that the absolute value |Δθ| is greater than threshold $\theta_{TH}$ (|Δθ|>$\theta_{TH}$), the routine proceeds from step S16 to step S19 wherein controller 3 commands alarm controller 6a to operate alarm 6 so as to generate alarm information and commands brake controller 16a to operate brake actuators 16 so as to generate braking force for avoiding vehicle VE from deviating from the lane. After the braking force is applied to the wheels by operating brake actuators 16, the routine returns to step S11.

On the other hand, when controller 3 determines at step S16 that |Δθ|≦$\theta_{TH}$, the routine proceeds to step S20 wherein controller 3 commands alarm controller 6a to turn off alarm 6 and commands brake controller 16a to put brake actuators 16 into an inoperative condition so as to stop generating the braking force for avoiding vehicle VE from deviating from the lane. Thereafter, the routine returns to step S11. Steps S19 and S20 functions as a braking means and a braking control means.

Accordingly, when it is determined that there is a possibility that vehicle VE deviates from the lane, the warning information is generated by alarm 6 and braking force is generated by brake actuators 16. These operations suppress the degree of the lane deviation and elongates the time reaching the deviation of the lane.

Although the third embodiment has been shown and described such that both of alarm 6 and brake actuators 16 are operated according to the lane deviation determination, it will be understood that the invention is not limited to this and may be arranged to operate only brake actuators 16. Further, although the third embodiment has been shown and described such that when controller 3 executes a processing for decreasing vehicle speed V by operating brake actuators 16 when controller determines that vehicle VE tends to deviate from the lane by operating brake actuators 16, it will be understood that the invention is not limited to this and may employ the other vehicle speed decreasing means. For example, the system according to the present invention may be arranged such that an output of an engine or motor of vehicle VE is decreased or a shift-down operation of a transmission is executed when controller 3 determines that vehicle VE tends to deviate from the lane.

While the embodiments according to the present invention have been shown and described such that yaw rate sensor 4 is employed as a turn condition detecting means, it will be understood that a steering angle sensor may be employed instead of yaw rate sensor 4 and an actual yaw rate may be estimated on the basis of the steering angle detecting by the steering angle sensor and vehicle speed V detected by vehicle speed sensor 5.

Further, a lateral acceleration may be employed instead of yaw rate. In such lateral acceleration employed case, a target lateral acceleration $Y_{G-NEED}$, by which vehicle VE moves from a position apart from the forward fixation point by lateral displacement XL1 to the center of the lane, is calculated from the following equation (4).

$$Y_{G\text{-}NEED}=(2 \times XL1 \times V \times V)/(L1 \times L1) \quad (4)$$

A lateral acceleration sensor is employed instead of yaw rate sensor 4.

When an absolute value of a difference between the actual lateral acceleration detected by the lateral acceleration sensor and target lateral acceleration $Y_{G\text{-}NEED}$ calculated from the equation (4) becomes greater than a preset threshold $Y_{G\text{-}TH}$, controller 3 determines that there is a possibility that vehicle VE deviates from the lane, and commands alarm controller 6a to operate alarm 6. Accordingly, if vehicle VE is traveling while keeping the lateral acceleration greater than or equal to the threshold $Y_{G\text{-}TH}$, it is forecasted that vehicle VE deviates from the lane.

The threshold $Y_{G\text{-}TH}$ is varied according to vehicle speed V so as to be decreased according to the increase of vehicle speed V. Accordingly, by this variation of threshold $Y_{G\text{-}TH}$ according to vehicle speed V, it becomes possible to firmly generate warning information at a time before vehicle VE deviates from the lane, even if vehicle VE travels at a high vehicle speed. Further, a steering angle sensor may be employed instead of the lateral acceleration sensor, and an actual yaw rate may be estimated on the basis of the steering angle detecting by the steering angle sensor and vehicle speed V detected by vehicle speed sensor 5.

Although the embodiments according to the present invention have been shown and described such that the fixation point A is set at the center portion between the model lane markers corresponding to the center of the lane and the requested yaw rate for reaching vehicle VE to the fixation point A, it will be understood that the invention is not limited to this arrangement, and the fixation point may be set at the other position such as a position where vehicle VE can travels along the lane without deviated from the lane.

Further, although the embodiments according to the present invention have been shown and described such that the lane markers are detected by executing the image processing as to picture images taken by camera 1 and that the road shape is estimated on the basis of the detected lane markers, it will be understood that the invention is not limited to this arrangement and the other road shape detecting means for detecting a road shape ahead of vehicle VE may be employed.

This application is based on a prior Japanese Patent Application No. 2000-269562 filed on Sep. 6, 2000 in Japan. The entire contents of this Japanese Patent Application are hereby incorporated by reference.

Although the invention has been described above by reference to a certain embodiment of the invention, the invention is not limited to the embodiments described above. Modifications and variations of the embodiment described above will occur to those skilled in the art, in light of the above teaching. The scope of the invention is defined with reference to the following claims.

What is claimed is:

1. A system for assisting a lane-keep traveling of a vehicle, comprising:
    a road image detector taking a view ahead of the vehicle;
    a vehicle behavior detector detecting a behavior of the vehicle; and
    a controller coupled to the road image sensor and the vehicle behavior detector, the controller being arranged,
        to calculate a road shape on the basis of the view taken by the road image detector,
        to calculate a target turn indicative value indicative of a target turn for reaching the vehicle to a target position, on the basis of the road shape detected,
        to calculate an actual turn indicative value indicative of an actual turn of the vehicle, and
        to determine whether the vehicle approaches a lane boundary of a traveling lane, on the basis of the target turn indicative value and the actual turn indicative value.

2. The system as claimed in claim 1, wherein the controller determines that the vehicle approaches the lane boundary when a difference between the target turn indicative value and the actual turn indicative value is greater than a threshold.

3. The system as claimed in claim 1, wherein the road image detector includes a camera that takes a picture image showing a view ahead of the vehicle, and an image processor that processes the picture image in order to detect lane markers corresponding to the lane boundaries of the traveling lane.

4. The system as claimed in claim 3, wherein the controller determines the target turn indicative value on the basis of an offset quantity between a direction of the target position and a direction of the camera directed ahead of the vehicle.

5. The system as claimed in claim 2, wherein the vehicle behavior detector includes a vehicle speed detector that detects a speed of the vehicle, and the threshold is decreased as the speed of the vehicle is increased.

6. The system as claimed in claim 1, wherein the target turn indicative value includes a target yaw rate, and the actual turn indicative value includes an actual yaw rate generated at the vehicle.

7. The system as claimed in claim 6, wherein the actual yaw rate is estimated from a steering angle and a speed of the vehicle.

8. The system as claimed in claim 1, wherein the target turn indicative value includes a target lateral acceleration, and the actual turn indicative value includes an actual lateral acceleration generated at the vehicle.

9. The system as claimed in claim 8, wherein the actual lateral acceleration is estimated from a steering angle and a speed of the vehicle.

10. The system as claimed in claim 1, further comprising an alarm that generate alarm information and an alarm controller that controls an operation of the alarm, wherein the alarm controller operates the alarm to generate alarm when the controller determines that the vehicle approaches the lane boundary.

11. The system as claimed in claim 1, further comprising a brake actuator that generates a braking force and a brake controller that controls an operation of the brake actuator, wherein the brake controller operates the brake actuator to generate the braking force when the controller determines that the vehicle approaches the lane boundary.

12. The system as claimed in claim 1, further comprising a driving-force generator that generates a driving force of the vehicle and a driving-force controller that controls an operation of the driving-force generator, wherein the driving-force controller controls the driving-force generator to decrease the driving force when the vehicle is approaching the lane boundary.

13. The system as claimed in claim 1, wherein the target position includes a center position between the lane boundaries ahead of the vehicle.

14. A lane deviation determining system of a vehicle comprising:
    road shape detecting means for detecting a shape of a road ahead of the vehicle;
    target turn detecting means for detecting a value indicative of a target turn necessary for reaching the vehicle to a target position on the basis of the road shape detected;

actual turn detecting means for detecting a value indicative of an actual turn of the vehicle; and lane deviation determining means for determining that the vehicle tends to deviate from a traveling lane on the basis of the target turn indicative value and the actual turn indicative value.

15. A method for assisting a lane keep traveling of a vehicle, the method comprising:

taking a view ahead of the vehicle;

detecting a behavior of the vehicle;

calculating a road shape on the basis of the view;

calculating a target turn indicative value indicative of a target turn for reaching the vehicle to a target position, on the basis of the road shape calculated;

calculating an actual turn indicative value indicative of an actual turn of the vehicle on the basis of the behavior of the vehicle; and determining whether the vehicle approaches a lane boundary of a traveling lane, on the basis of the target turn indicative value and the actual turn indicative value.

* * * * *